(12) United States Patent
Dolan

(10) Patent No.: US 12,724,495 B2
(45) Date of Patent: Sep. 1, 2026

(54) COMPUTER INPUT DEVICE AND METHOD OF USE

(71) Applicant: Kevin P. Dolan, Doylestown, PA (US)

(72) Inventor: Kevin P. Dolan, Doylestown, PA (US)

( * ) Notice: Subject to any disclaimer, the term of this patent is extended or adjusted under 35 U.S.C. 154(b) by 0 days.

(21) Appl. No.: 19/386,372

(22) Filed: Nov. 12, 2025

(65) Prior Publication Data

US 2026/0072525 A1 Mar. 12, 2026

Related U.S. Application Data

(63) Continuation-in-part of application No. 18/948,781, filed on Nov. 15, 2024, now Pat. No. 12,504,830, which is a continuation of application No. 18/244,850, filed on Sep. 11, 2023, now Pat. No. 12,182,340.

(51) Int. Cl.
*G06F 3/02* (2006.01)

(52) U.S. Cl.
CPC .................................... *G06F 3/021* (2013.01)

(58) Field of Classification Search
CPC ........................................................ G06F 3/021
USPC ........................................................... 345/156
See application file for complete search history.

(56) References Cited

U.S. PATENT DOCUMENTS 6,297,953 B1 10/2001 Helot
6,504,709 B2 1/2003 Yang
7,038,908 B2 5/2006 Usui
7,613,842 B2 * 11/2009 Kong ...................... G06F 3/038 710/13
7,733,637 B1 6/2010 Lam
9,855,506 B2 * 1/2018 Kawanabe .............. A63F 13/00
10,150,043 B2 12/2018 Zhang et al.
10,810,570 B1 10/2020 Martin
12,504,830 B2 * 12/2025 Dolan ..................... G06F 3/021
2002/0071249 A1 * 6/2002 Yang ...................... H01H 13/84 361/679.4
2002/0099887 A1 7/2002 Lu
2002/0113778 A1 * 8/2002 Rekimoto ............... G06F 3/046 345/173
2003/0107737 A1 6/2003 Roufas et al.
2004/0056781 A1 * 3/2004 Rix ....................... G06F 3/0202 341/20
2004/0140955 A1 * 7/2004 Metz ...................... G06F 3/038 345/166
2005/0042584 A1 2/2005 Ekberg
2008/0285213 A1 11/2008 Tan
2013/0099447 A1 * 4/2013 Patton ....................... A63F 1/02 273/293
2015/0103018 A1 4/2015 Kamin-Lyndgaard
2018/0036635 A1 * 2/2018 Townley ................ A63F 13/92
2020/0058008 A1 2/2020 Hicks
(Continued)

*Primary Examiner* — Calvin C Ma
(74) *Attorney, Agent, or Firm* — IP Works Law PLLC

(57) ABSTRACT

An educational information system and method includes a data reading unit having a housing with a top surface; and a plurality of wireless data reading units in the housing, wherein the data reading unit reads educational data, via the wireless data reading units, from at least one card containing the educational data and transmits the educational data to a computer screen for display, each card of the at least one card comprises an icon on a top card surface, the icon representative of the educational data stored on the associated card of the at least one card, and the at least one card is opaque.

20 Claims, 7 Drawing Sheets

(56) References Cited

U.S. PATENT DOCUMENTS

| | | | |
|---|---|---|---|
| 2021/0064154 | A1 | 3/2021 | Bustamante |
| 2021/0124433 | A1 | 4/2021 | Bustamante |
| 2022/0110218 | A1 | 4/2022 | Bustamante |

* cited by examiner 101b
107
103
101a
104
106
106
106
106
104
102
100
101

COMPUTER INPUT DEVICE AND METHOD OF USE

STATEMENT OF RELATED APPLICATIONS

This application is a continuation-in-part of U.S. patent application Ser. No. 18/948,781 entitled "Computer Input Device And Method Of Use", filed on Nov. 15, 2024, which is a continuation of U.S. patent application Ser. No. 18/244,850, now U.S. Pat. No. 12,182,340, entitled "Computer Input Device And Method Of Use", filed on Sep. 11, 2023, the disclosure of which is hereby incorporated by reference herein in its entirety.

BACKGROUND OF THE INVENTION

The present invention relates to a computer input device and a method for using the same. More particularly, the present invention provides a device which allows for a user to input information into the computer via a hands-on, manipulative based experience, significantly different from that achieved with a standard keyboard, mouse, or joystick.

While there are many different types of computer inputs available, many of them include a keyboard or mouse type input. There is nothing currently which allows an individual to use a manipulative based input.

In today's world, education is moving more and more toward the use of technology. While technology can be helpful, individuals learn in different ways and using only a keyboard may be detrimental to some students' education. There are many people who learn through physical touch or object association. By only having a keyboard, this takes away from that ability. This means that individuals may struggle to learn just because there is not an appropriate input device.

In other embodiments, older individuals may not be familiar with a computer or may have physical limitations. It is no secret that, in some instances, it can be difficult to learn how to use a computer. One of the reasons for the learning curve is the keyboard. The data entry method can be difficult to learn and navigate. This can lead to one not wishing to learn how to use a computer at all.

Consequently, there is a need for an improvement in the art of computer use. The present invention substantially diverges in design elements from the known art, while at the same time solving a problem many people face when learning in general, especially when using a computer. In this regard, the present invention substantially fulfills these needs.

SUMMARY OF THE INVENTION

An object of the present invention according to a first embodiment of the present invention includes an educational information system including a data reading unit having a housing with a top surface; and a plurality of wireless data reading units in the housing, wherein the data reading unit reads educational data, via the wireless data reading units, from at least one card containing the educational data and transmits the educational data to a computer screen for display, each card of the at least one card comprises an icon on a top card surface, the icon representative of the educational data stored on the associated card of the at least one card, and the at least one card is opaque.

Another object of the present invention includes the at least one card containing educational data is placed proximately to at least one wireless data reading unit of the plurality of wireless data reading units.

Another object of the present invention includes the at least one card is a radiofrequency identification (RFID) card.

Another object of the present invention includes the educational data includes instructions for an action for a computer to perform.

Another object of the present invention includes the action is opening a webpage associated with the at least one card.

Another object of the present invention includes the educational data includes an image representing a word to be displayed on the computer screen.

Another object of the present invention includes the educational data represents words that are arranged to form a sentence.

Another object of the present invention includes the top surface of the housing is flat.

Another object of the present invention includes the icon on the top card surface of the at least one card is configured to be generated by a user of the educational information system.

Another object of the present invention includes the educational data contained on the at least one card is configured to be changeable by a user of the educational information system.

An object of the present invention according to a second embodiment of the present invention includes a method of conveying educational information including reading educational data, from at least one card containing the educational data, via a data reading unit having a housing with a top surface and a plurality of wireless data reading units; transmitting the educational data to a computer; and wherein: each card of the at least one card comprises an icon on a top card surface, the icon representative of the educational data stored on the associated card of the at least one card, and the at least one card is opaque.

Another object of the present invention includes placing a card containing educational data proximate to at least one wireless data reading unit of the plurality of wireless data reading units.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
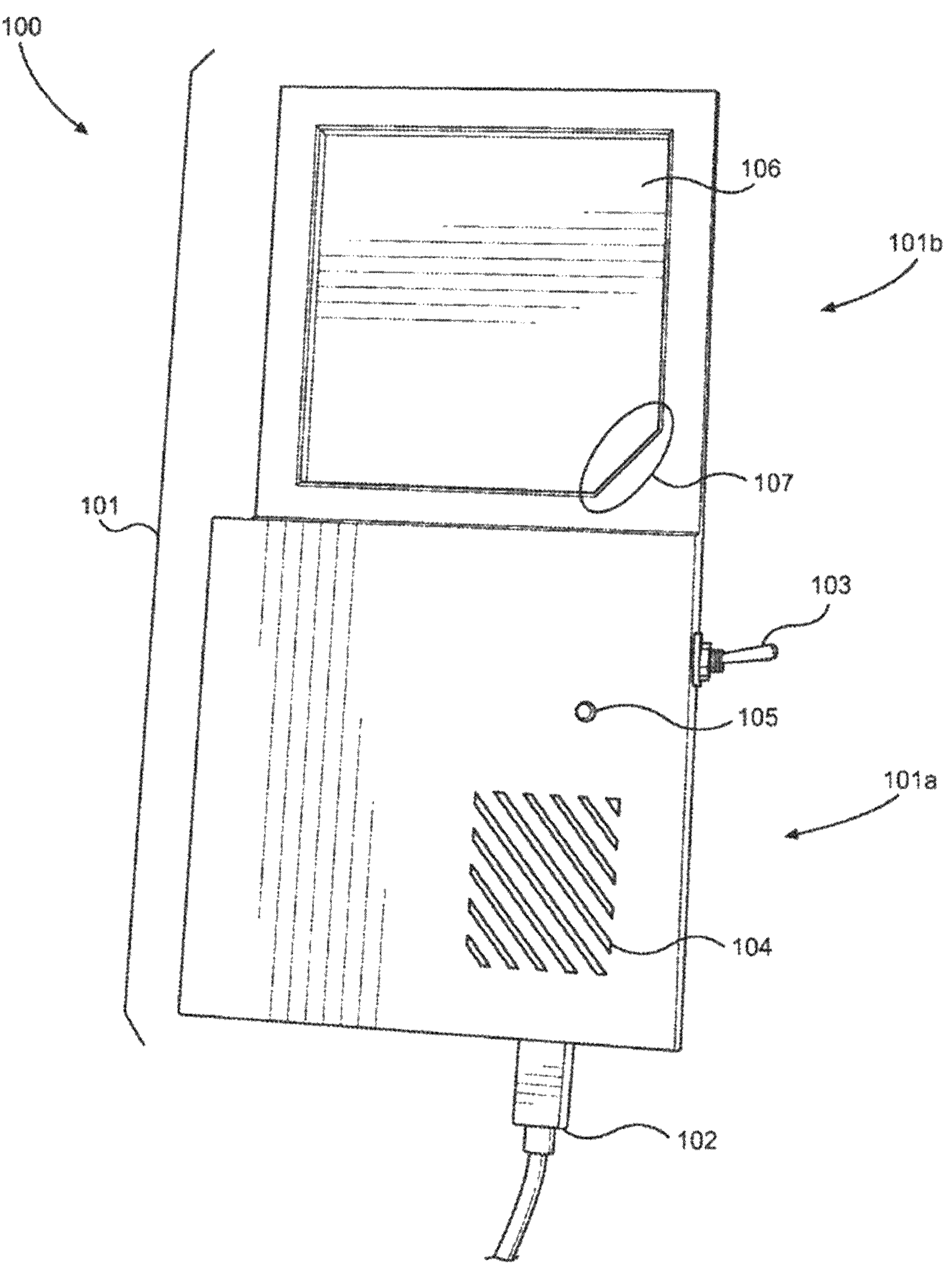
FIG. 1 shows a perspective view of an embodiment of the computer input device.

With regard to the reference numerals used, the following numbering is used throughout the drawings.

| | |
|---|---|
| 100 | Computer input device |
| 101 | Housing |
| 101a | First section |
| 101b | Second section |
| 102 | Input wire |
| 103 | Power switch |
| 104 | Vents |
| 105 | Power indicator |
| 106 | Indentation |
| 107 | Cut off corner |
| 301 | Input objects |
| 301a | Rear side |
| 302a | First cut corner |
| 302b | Second cut corner |
| 303a | Symbol |
| 303b | Letters |
| 303c | Numbers |
| 303d | Character string |
| 304 | Magnets |
| 401 | Cover |
| 402 | RFID tag |
| 501 | Power source |
| 502 | Microprocessor |
| 503 | Input reader |
| 504 | Memory |
| 505 | transceiver |
| 506 | Computer |
| 601 | Learning program |
| 602 | Computer screen |

DETAILED DESCRIPTION OF THE INVENTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to FIG. 1, there is shown a perspective view of an embodiment of the computer input device 100. The computer input device 100 may take different forms and some components may be duplicated as described herein. In one embodiment, the computer input device 100 is comprised of a housing 101. In the shown embodiment, the housing 101 has a first section **101*a* which encloses various electronic components as required by the computer input device 100. These components will be detailed in the description of FIG. 5**.

In one embodiment, the computer input device 100 has an input wire 102 which enters through a port in the first section **101*a* of the housing 100. The input wire 102 will connect the computer input device 100 to the desired computer. In another embodiment, instead of an input wire 102, there is a wireless device which will connect the computer input device 100 to a desired computer. In one embodiment, there is a power switch 103 connected to the first section 101*a* of the housing 101. In the shown embodiment, the power switch 103 is shown as a toggle switch. However, in other embodiments, different switch types may be used. In additional embodiments, the power switch 103** may be substituted for a power button.

In different embodiments, additional components may be attached to the first section **101*a* of the housing 100. In one embodiment, these components include vents 104. In the shown embodiment, the vents 104 are shown on the top of the first section 101***a*; however, the vents 104 may also be located in any necessary location around the housing 101. In another embodiment, a power indicator 105 is secured to the first section 101*a* of the housing 101. In the shown embodiment, the power indicator 105 is a light which will illuminate when the computer input device 100 is receiving power and is in the "on" configuration.

In the shown embodiment, the housing 101 also includes a second section 101*b*. In the shown embodiment, the second section 101*b* of the housing 101 includes a step down from the first section 101*a*. This step down allows for the computer input device 100 to be reduced in size and weight. In many embodiments, the second section 101*b* of the housing 101 includes an indentation 106. The indentation 106 marks the location of the input reader within the computer input device 100. The indentation 106 will allow for input objects to be placed therein. The input objects will be detailed in the description of FIG. 3 and FIG. 4.

In one embodiment, the input objects are placed within the indentation 106 with a designed orientation. In order to facilitate the proper orientation in these embodiments, the indentation 106 will have a specific shape. In the shown embodiment, the indentation 106 is shown as a square. The square has a cut off corner 107. In these embodiments, the input objects has a matching shape to ensure proper orientation within the indentation 106.

While the housing 101 is described as having a first section 101*a* and a second section 101*b*, it should be understood that these sections do not need to be physically distinct and that these sections are being described for the functionality represented. The housing 101 may have, for example, a first section 101*a* placed directly beneath and connected to the second section 101*b* where the indentation 106 or input reader is located.

Figure 2:
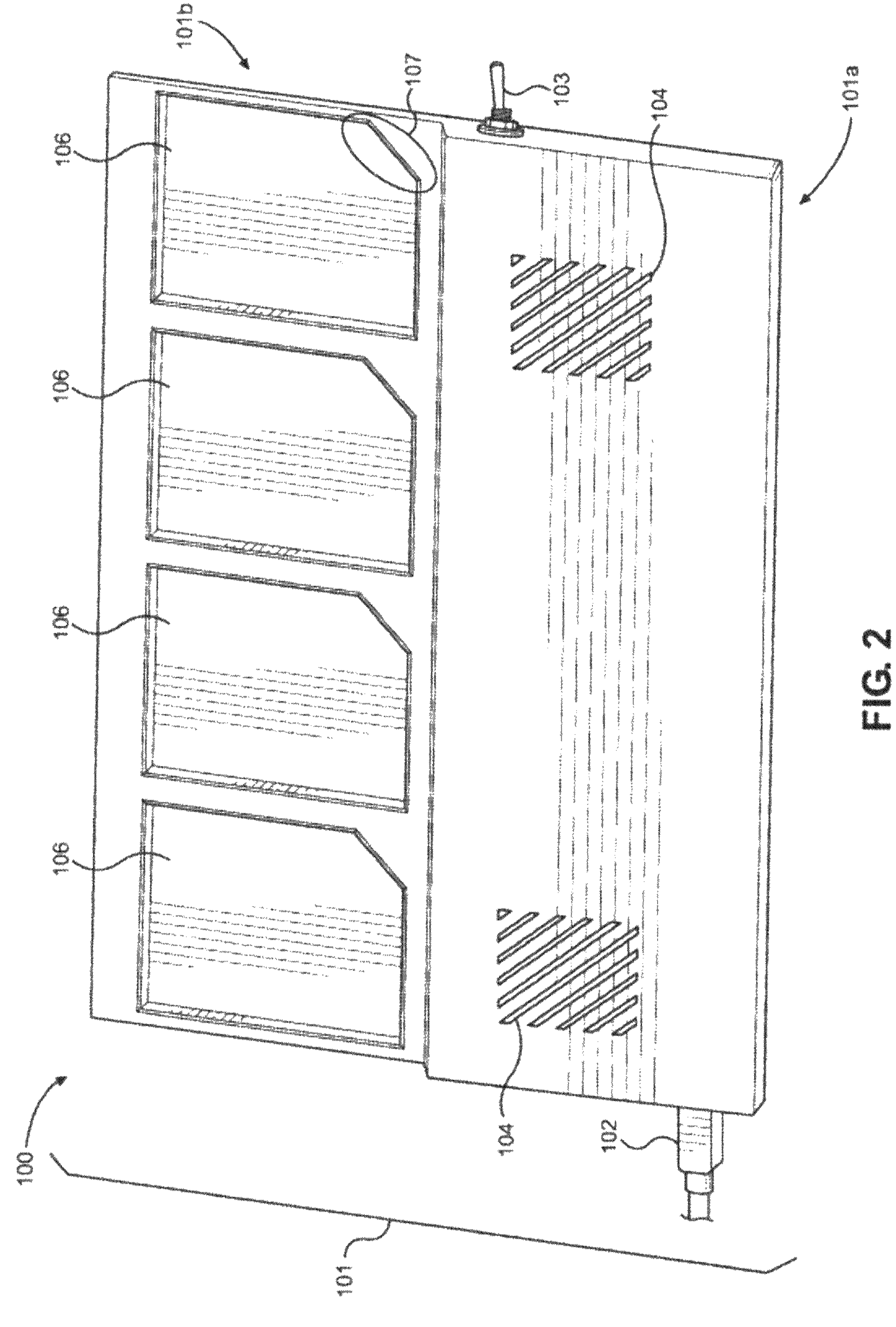
FIG. 2 shows a perspective view of an embodiment of an expanded computer input device.

Referring now to FIG. 2, there is shown a perspective view of an embodiment of an expanded computer input device. In this embodiment, several of the features of the computer input device 100 have been duplicated. This will allow for the ability to input multiple items before removing the preceding inputs. In one embodiment, the input will be entered when an input object is placed within the indentation 106. In another embodiment, the input is entered once all the indentations 106 are filled.

In the shown embodiment, the computer input device 100 still includes a housing 101. The housing 101 still comprises a first section 101*a* and a second section 101*b*. There is an input wire 102 which connects the entire device to a desired computer. In another embodiment, instead of an input wire 102 the computer input device 100 uses a wireless connection. Further, there is a single power switch 103, which activates the computer input device 100. The power indicator is not shown in this embodiment. However, one of ordinary skill in the art will understand that a power indicator could be added to this embodiment without departing from the present invention.

In this embodiment, the first section 101*a* of the housing 101 includes a plurality of vents 104 instead of a single vent. The number of vents 104 is in no way meant to be limiting.

In this embodiment, the number of input devices has been increased. This increase has been demonstrated by the increased number of indentations 106. In this embodiment, there is an input device located under each indentation 106. In another embodiment, there may be a single input reader which stretches along the entirety of the indentations 106.

In the shown embodiment, each indentation also has the cutoff corner 107. Further, in the shown embodiment, there are four indentations 106. In other embodiments, different numbers of indentations may be used, and the shown number is not intended to be limiting. In other embodiments, indentations 106 may not be necessary at all. This is due to the nature of the input device as described herein. For example, if an RFID input is used, the orientation of the input objects may not matter.

Referring now to FIGS. 3-4B and 7-8, there is shown a perspective view and a rear view of an embodiment of input objects 301 for use with the computer input device 100. In order to allow for a more interactive and hands-on experience, the computer input device 100 uses a plurality of input objects 301. The input objects 301 allow a user to pick up a chosen input object 301 and place the chosen input object 301 on the computer input device 100. The computer input device 100 reads the input object 301 and displays the input on a computer. In different embodiments, the input objects 301 may include different features. For example, each character of the ASCII character set may be placed on an input object 301. Further, additional characters, character strings, drawings, or other combination of the two may be represented by an input object 301. In an exemplary embodiment, the input objects 301 comprise a thermoplastic material (such as polylactic acid [PLA]), a metal material (such as aluminum), a wooden material, and/or any other suitable material. In an exemplary embodiment, the input objects 301 are opaque.

In the shown embodiment, several different versions of input objects are shown. In one embodiment, the input objects 301 have a first cut corner 302*a*. This first cut corner 302*a* matches the indentation of the computer input device. In other embodiments, the shapes of the indentation and the input objects 301 may vary such that no cut corners are required. In this embodiment, the first cut corner 302*a* ensures that the input object 301 is properly placed within the computer input device.

In another embodiment, there is also a second cut corner 302*b*. The second cut corner 302*b* allows for a user to be able to grip the input object 301 more easily for removal from the computer input device.

The computer input objects 301 are shown with various depictions/icons thereon. In one embodiment, the input objects 301 have letters 303*b* or numbers 303*c* thereon. These input objects 301 input the shown letter 303*b* or number 303*c* when placed on the computer input device. In another embodiment, the input object 301 has a depiction or symbol thereon 303*a*. This symbol 303*a* allows for entire words or phrases to be input with the use of a single tile. For example, the shown symbol 303*a* is a heart. When this input object 301 is placed on the computer input device, the input is the phrase "I love you," which is then displayed as an output on a computer.

In another embodiment, a character string 303*d* is shown on the input object 301. This embodiment, similar to the symbol 303*a*, is used to input a larger input at once. In the shown example, the character string 303*d* is CNN. When this input object 301 is placed on the computer input device, the input is for the CNN website. In one embodiment, the input object 301 opens a web browser and opens the CNN website. In another embodiment, the user must first be in the web browser's URL bar for the input to work properly.

Figures 3, 4A, 4B:
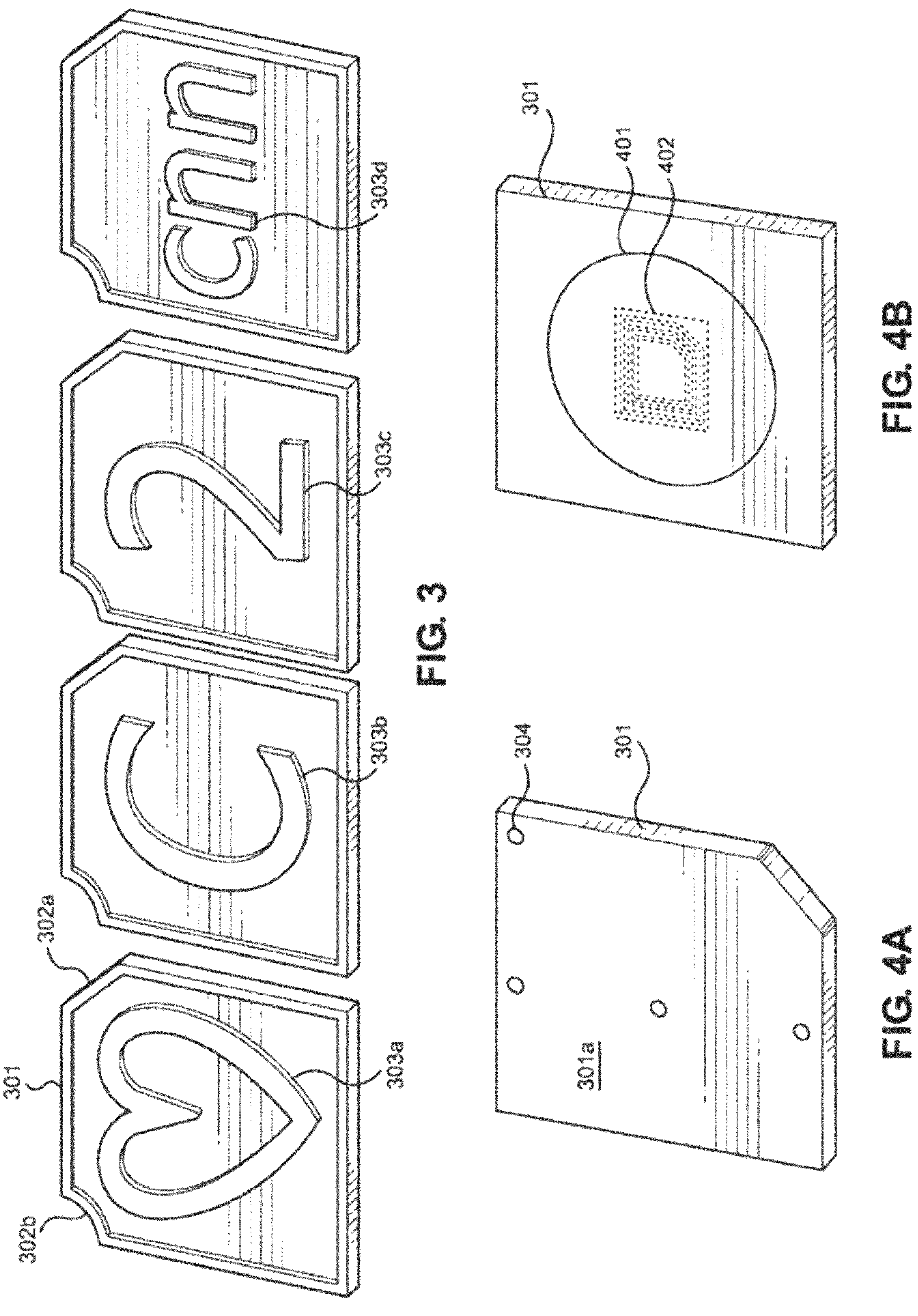
FIG. 3 shows a perspective view of an embodiment of input objects for use with the computer input device.
FIG. 4A shows a rear view of an embodiment of input objects for use with the computer input device.
FIG. 4B shows a rear view of an embodiment of input objects for use with the computer input device.

In an exemplary embodiment, the icon on a top surface of the input objects 301 may be a raised and embossed icon (see FIG. 3). In an alternative embodiment, the icon may be flush with the top surface of the input objects (see also FIG. 6). In this embodiment, the icon may be integral with input objects 301 or may be a separate element affixed to the top surface of the input objects 301. Such separate elements may be affixed via adhesive (e.g., a sticker), ultrasonic welding, screws, and/or any other suitable fastening means.

Figure 7:
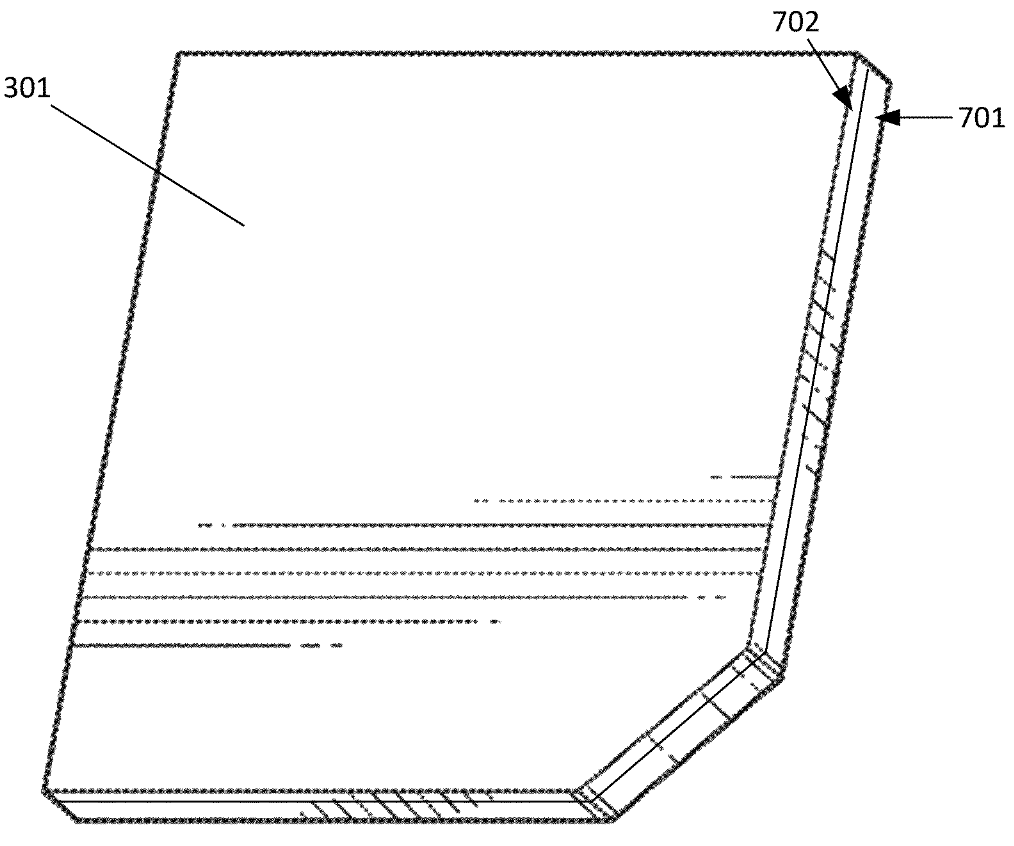
FIG. 7 shows an embodiment of a two-layer input object for use with the computer input device.

Referring now specifically to FIG. 7, in an exemplary embodiment, the input objects 310 may comprise a base layer 701 and a top layer 702. The base layer 701 is configured as a structural layer comprising a plastic material, such as polylactic acid (PLA). In this embodiment, the top layer 702 is configured as a whiteboard that is adhesively affixed to the base layer 702. For example, the user may write on the top surface of the input object 301 utilizing a dry-erase marker to create a custom icon on the input object 301 representative of the educational data stored thereon.

Figure 8:
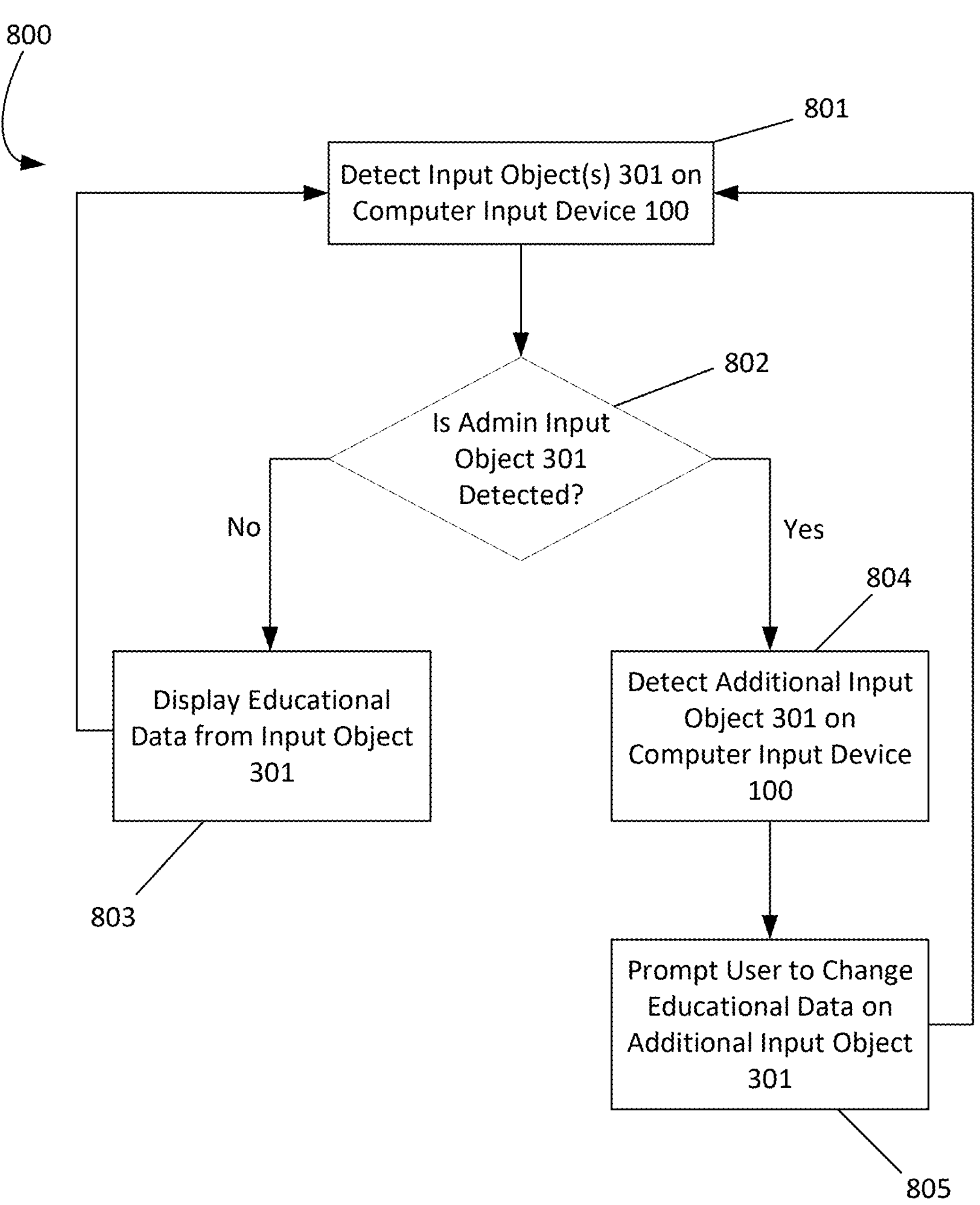
FIG. 8 shows an embodiment of a method of using the computer input device.

Referring specifically now to FIG. 8, a method 800 of using the computer input device 100 is shown. In an exemplary embodiment, the input objects 301 may be configured to allow the user to change or otherwise manipulate the educational data stored thereon. In an exemplary embodiment, the computer input device 100 is configured to detect 801 when an input object 301 has been placed thereon. The computer input device 100 is then configured to detect 802 if the input object 301 is an admin input object 301. An input object 301 may be configured with a password, passkey, encryption, and/or other suitable digital signature to indicate that the user is to be granted administrative access. When the admin input object 301 is not detected (step 803), the computer input device 100 is configured to display the educational data stored on the input object 301. When the admin input object 301 is detected (step 804), the computer input device 100 is configured to detect an additional input object 301. After the additional input object 301 is detected, the computer input device 100 may prompt the user to edit the educational data stored on the additional input object 301 (step 805). The user may edit an image stored on input object 301, the digital name of the input object 301, and/or any other suitable aspect of the educational data. In use, for example, the computer input device 100 is configured to allow a child to place an input object 301 onto the computer input device 100 to display a picture associated with the icon (e.g., a picture of a grandparent for an icon saying “Pop-Pop” or “Nana”). At another time, a parent, guardian, and/or teacher of the child may place the admin input object 301 onto the computer input device 100 before placing an additional input object 301 thereon. The parent or guardian may update or change the picture stored on the card, such as to provide a more recent or up-to-date image of the family (e.g., the “Pop-Pop” or “Nana”).

In different embodiments, the computer input device 100 may use any manner of input reader, such that the identity of the input objects 301 may be determined. Specifically, in FIG. 4A, there is shown an embodiment where a Hall Effect device is contemplated as the input reader. Hall Effect devices use magnetic fields to generate input. Therefore, for this embodiment, the rear side 301*a* of the input objects 301 are embedded with a plurality of magnets 304. The different positions of the magnets 304 will allow for each input object 301 to have a different input.

Specifically, in FIG. 4B, there is shown an embodiment of an input object 301 for an RFID tag. In this embodiment, an RFID tag 402 is placed within an indentation on the back of the input object 301. In one embodiment, a cover 401 or other sealing device is then placed over the RFID tag 402. In different embodiments, a cover 401 may be placed over any form of information transfer device added to the input object 301. Further, in this embodiment, the input object 301 is a full square. This is because an RFID tag is not position specific. It may be read if it is in proper proximity to an RFID tag reader. For an embodiment such as this, the computer input device 100 may not have any indentations for the input objects 301 to be placed.

Figure 5:
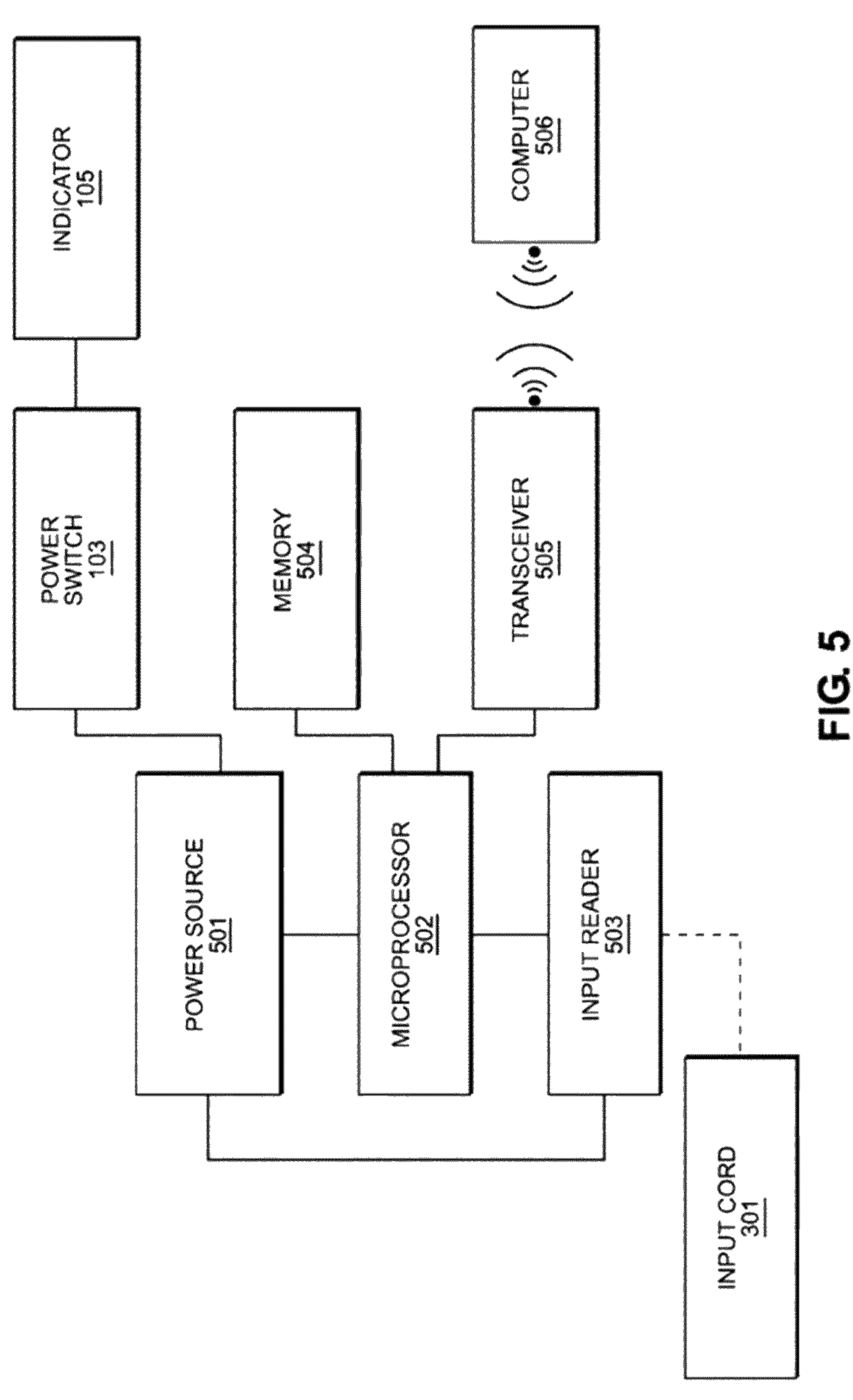
FIG. 5 shows an embodiment of a wiring diagram of the computer input device.

Referring now to FIG. 5, there is shown an embodiment of a wiring diagram of the computer input device 100. The computer input device 100 includes a power source 501. In one embodiment, the power source 501 is the computer 506. In another embodiment, the power source 501 is an internal power source such as a battery. This allows for the computer input device to be wireless as discussed below. In another embodiment, the power source may include a plug-in power source. This prevents the need for batteries and still allows for a wireless connection to the computer.

The power source 501 is operably coupled to a power switch 103. The power switch 103 allows for the computer input device to be turned off when not in use, thereby saving power. In one embodiment, the power switch 103 is operably coupled to the power indicator 105 as described above. The power indicator 105 allows a user to know if the computer input device is on and receiving power.

In one embodiment, the power source 501 is also operably coupled to a microprocessor 502. The microprocessor 502 is shown to represent any processing power that is needed for the computer input device to properly function, and the type of processor does not affect the spirit of the invention. The microprocessor 502 is operably coupled to a memory 504. This allows for input types to be stored as needed.

The microprocessor 502 and the power source 501 are operably coupled to the input reader 503. In different embodiments, the input reader 503 may come in the form of many different electronic readers and described above. The input reader 503 reads input objects 301 as they are placed thereon.

The microprocessor 502 is operably coupled to a transceiver 505. In one embodiment, the transceiver 505 is wired and sends and receives signals with the desired computer 506 via a wired connection. In another embodiment, the transceiver 505 is a wireless transceiver and is able to transmit and receive information to and from the computer 506 wirelessly. One of ordinary skill in the art will understand that there are multiple wireless connection technologies, and while each provides different benefits the use of any of them will accomplish the desired action of communicating with the desired computer 506.

Figure 6:
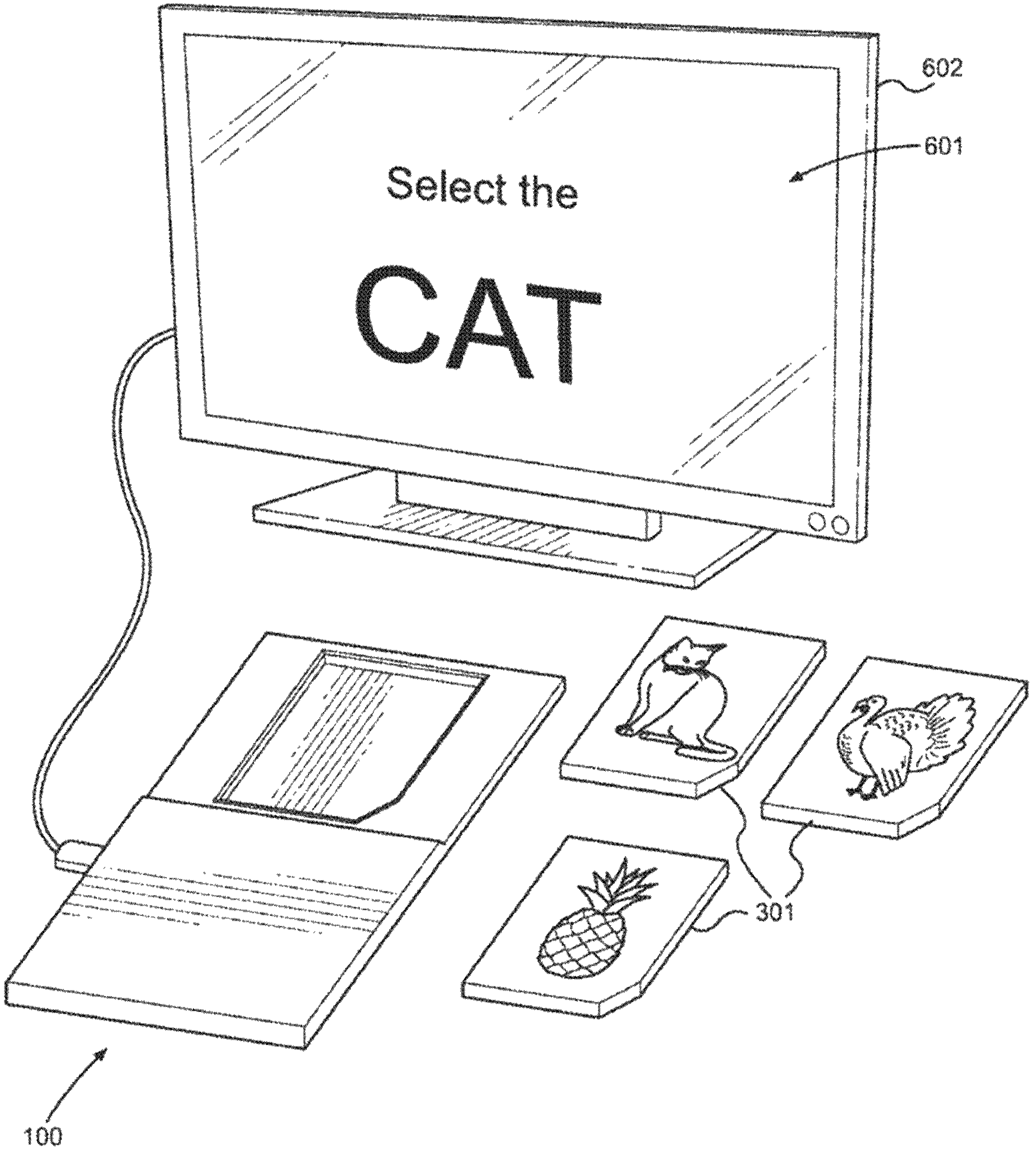
FIG. 6 shows an embodiment of a learning program for use with the computer input device.

Referring now to FIG. 6, there is shown an embodiment of a learning program for use with the computer input device 100. In one embodiment, the computer input device 100 is configured to work with a specific computer program. This is in no way meant to be limiting on the use of the computer input device 100. Even if the specialized program was to be used, the computer input device 100 could still be used with the rest of the computer functions.

In one embodiment, a learning program 601 is created. In this embodiment, the learning program 601 displays various items on a computer screen 602. In the shown example, the computer screen displays “Select the CAT.” In this embodiment, there are a plurality of input objects 301 which have different symbols thereon. The student selects the appropriate input object 301, in this case the one depicting the cat, and places it on the computer input device 100. If the selected input object 301 is correct, the student will progress.

This is just one embodiment of a potential learning program 601. In other embodiments, the program may be used to display mathematical formulas, and the student inputs the answers via the input objects 301. By using the computer input device 100 alongside the learning program 601, a student is able to have a more hands-on learning experience.

In other embodiments, for example, the learning program 601 may display a picture of a cat and ask the user to spell cat. This would then be accomplished by placing the letters CAT on the computer input device 100. In yet another embodiment, the user could simply spell cat by placing the correct letters on the computer input device 100. The computer learning program 601 could then display a picture of a cat.

Those skilled in the art will recognize improvements and modifications to the preferred embodiments of the present disclosure. All such improvements and modifications are considered within the scope of the concepts disclosed herein and the claims that follow.

What is claimed is:

1. An educational information system, comprising:

a data reading unit having a housing with a top surface, the data reading unit being configured to wirelessly read educational data from at least one card; and a plurality of wireless data reading units within the housing, wherein:

each card of the at least one card has the educational data stored thereon, the data reading unit reads the educational data, via the wireless data reading units, from at least one card and transmits the educational data to a computer screen for display, each card of the at least one card comprises an icon on a top card surface, the icon representative of the educational data stored on the associated card of the at least one card, and an entirety of each card of the at least one card is opaque.

2. The educational information system of claim 1, wherein the at least one card containing educational data is placed proximately to at least one wireless data reading unit of the plurality of wireless data reading units.

3. The educational information system of claim 2, wherein the at least one card is a radiofrequency identification (RFID) card.

4. The educational information system of claim 1, wherein the educational data includes instructions for an action for a computer to perform.

5. The educational information system of claim 4, wherein the action is opening a webpage associated with the at least one card.

6. The educational information system of claim 1, wherein the educational data includes an image representing a word to be displayed on the computer screen.

7. The educational information system of claim 1, wherein the educational data represents words that are arranged to form a sentence.

8. The educational information system of claim 1, wherein the top surface of the housing is flat.

9. The educational information system of claim 1, wherein the icon on the top card surface of the at least one card is configured to be generated by a user of the educational information system.

10. The educational information system of claim 1, wherein the educational data contained on the at least one card is configured to be changeable by a user of the educational information system.

11. A method of conveying educational information, the method comprising:

wirelessly reading educational data, from at least one card having the educational data stored thereon, via a plurality of wireless data reading units located within a housing of a data reading unit, the housing comprising a top surface;

transmitting the educational data to a computer; and displaying the educational data on a screen on the computer, wherein:

each card of the at least one card comprises an icon on a top card surface, the icon representative of the educational data stored on the associated card of the at least one card, and an entirety of each card of the at least one card is opaque.

12. The method of claim 11, further comprising placing a card containing educational data proximate to at least one wireless data reading unit of the plurality of wireless data reading units.

13. The method of claim 12, wherein the at least one card is an RFID card.

14. The method of claim 11, wherein the educational data includes instructions for an action for a computer to perform.

15. The method of claim 14, wherein the action is opening a webpage associated with the at least one card.

16. The method of claim 11, wherein the educational data includes an image representing a word to be displayed on the screen.

17. The method of claim 11, wherein the educational data represents words that are arranged to form a sentence.

18. The method of claim 11, wherein the top surface of the housing is flat.

19. The method of claim 11, wherein the icon on the top card surface of the at least one card is configured to be generated by a user of the educational information system.

20. The method of claim 11, wherein the educational data contained on the at least one card is configured to be changeable by a user of the educational information system.

* * * * *